United States Patent [19]
Bur et al.

[11] Patent Number: 5,519,211
[45] Date of Patent: May 21, 1996

[54] METHOD AND APPARATUS FOR MONITORING RESIN CRYSTALLIZATION AND SHRINKAGE DURING POLYMER MOLDING

[75] Inventors: Anthony J. Bur, Rockville, Md.; Charles L. Thomas, Salt Lake City, Utah

[73] Assignee: United States of America as represented by the Secretary of Commerce, Washington, D.C.

[21] Appl. No.: 260,379

[22] Filed: Jun. 14, 1994

[51] Int. Cl.[6] .......................... G01N 29/20; B29C 45/76
[52] U.S. Cl. .................... 250/227.19; 250/573; 356/239
[58] Field of Search .................... 250/559.12, 559.13, 250/559.4, 539.42, 227.19, 573, 574, 576; 356/133, 237, 239

[56] References Cited

U.S. PATENT DOCUMENTS

| | | | |
|---|---|---|---|
| 4,529,306 | 7/1985 | Kilham et al. | 356/237 |
| 4,651,011 | 3/1987 | Ors et al. | 250/459.1 |
| 4,672,218 | 6/1987 | Chrisman et al. | |
| 4,827,121 | 5/1989 | Vidrine, Jr. et al. | 356/133 |
| 4,904,080 | 2/1990 | Afromowitz | 356/133 |
| 4,918,520 | 4/1990 | Katsuoka et al. | |
| 5,009,102 | 4/1991 | Afromowitz | 73/590 |
| 5,015,843 | 5/1991 | Seitz et al. | |
| 5,032,734 | 7/1991 | Orazio, Jr. et al. | |
| 5,188,845 | 2/1993 | Payne | |
| 5,238,381 | 8/1993 | Rankin, II et al. | |
| 5,374,821 | 12/1994 | Muhs et al. | 250/227.16 |
| 5,384,079 | 1/1995 | Bur et al. | 264/21 |

*Primary Examiner*—Edward P. Westin
*Assistant Examiner*—John R. Lee
*Attorney, Agent, or Firm*—Evenson, McKeown, Edwards & Lenahan

[57] ABSTRACT

A method and apparatus for monitoring the crystallinity and shrinkage of a polymeric resin during molding in which light is introduced into the mold cavity, from an optical fiber through a light permeable window, transmitted through the resin in the mold, reflected from the opposite side of the mold, collected again by the optical fiber sensor, and the attenuation of the light is analyzed to detect mold filling, the onset of polymer crystallization, and separation of the polymeric material from the mold wall due to shrinkage, which separation also produces the geometry of an interferometer which can be used to detect shrinkage and to measure the rate of shrinkage by counting the minima of interference fringes.

20 Claims, 9 Drawing Sheets

METHOD AND APPARATUS FOR MONITORING RESIN CRYSTALLIZATION AND SHRINKAGE DURING POLYMER MOLDING

BACKGROUND OF THE INVENTION

Processing parameters which affect product quality and productivity in the molding of plastics can be divided into three categories: machine parameters, materials properties, and final product quality specifications. Without some way to monitor materials properties in real-time during the molding operation, the processor must rely solely on controlling machine parameters in order to maintain product quality. Experience has shown that this approach is difficult to undertake because of the nonlinear multi-parameter relationship between the product quality specifications and machine variables. A more effective strategy is real-time measurement and control of materials properties because their relationships to final product behavior are less complicated and often based on well founded physical laws. However, carrying out materials measurements in real-time is more difficult than adjusting machine parameters because the technology heretofore available for in-line, in-situ materials measurements has been inadequate.

For the polymer injection molder, crystallization and shrinkage of production parts are important materials properties. For example, the measurement of crystallization growth in real-time could be used to determine the time of product solidification, knowledge of which could in turn be used to minimize mold cycle time. Part shrinkage is one of the most important pieces of information for a molder because the primary purpose of molding is to form a polymer into the specific geometry of specified dimensions, and the final dimensions of the product are equal to the shape of the mold cavity minus shrinkage. For crystallizable polymers, the amount of shrinkage is of more concern than for a glass forming polymer because of the relatively large contraction upon crystallization. The amount of crystallization not only determines the magnitude of contraction and shrinkage of the product but also its mechanical properties. Thus, dimensional and mechanical properties consistency of the product can be maintained by measuring and controlling crystallization. Another approach to maintaining dimensional stability is to measure and control the rate of shrinkage at a specified time in the mold cycle by feedback control of operating conditions such as temperature of injected resin, temperature of the mold, injection pressure and hold pressure.

The concept of using optical measurements as an in-situ, real-time tool to monitor injection molding has been disclosed in Bur et al., *Proc. Soc. Plastics Eng. Ann. Tech. Mtg.*, May 1993, p. 135, which describes an injection molding machine optically instrumented using optical fibers to transmit light from the mold cavity. The described method, however, uses fluorescence spectroscopy as an indicator of the onset of polymer solidification in the mold and requires the use of fluorescent dyes doped into the resin prior to processing. The obligatory presence of such fluorescent dyes can affect the optical properties of the polymer material and of the finished molded article. Thus, there is a need for a monitoring method which does not require the use of a fluorescent dye.

The use of light scattering by semi-crystalline polymeric materials as a tool to characterize the basic materials properties of crystalline polymers has been reported in the literature. Light transmission and scattering by crystallizable polymer materials have been described by Stein et al. who observed that scattering during the crystallization of polyethylene showed an increase in scattered light intensity which passed through a maximum and then decreased [See *J. Polym. Sci.*, Vol. 20, p. 327 (1956); *J. Polym. Sci.*, Vol. 45, p. 521 (1960); *J. Appl. Phys.*, Vol. 31, p. 1873 (1960)] and that light transmitted through crystallizing polyethylene passed through a minimum [See *J. Polym. Sci.*, Pt. C, No. 18, p. 1 (1967)]. The physical basis for the maximum in scattered light intensity (or minimum in transmitted light) has been attributed to the difference in index of refraction of a growing crystal spherulite and its surrounding amorphous medium [See Yoon et al., *J. Polym. Sci. Polym. Phys.*, Vol. 12, p. 735 (1974)]. However, no attempt was made to use this knowledge to detect either the onset of crystallization or shrinkage of a polymeric resin during molding.

Chrisman et al., U.S. Pat. No. 4,672,218 describes a method for optically determining the onset of crystallization of dissolved solids from a solvent or mother liquor which utilizes an optical fiber probe containing illuminating fibers and collecting fibers immersed in a vessel containing the solution of crystallizable material. Although this method purports to detect the onset of crystal nucleation, it is not suitable for detecting the onset of crystallization of a molded polymer. The method relies on reflection and backscattering of light for detection of crystallization, and it is well known that in polymer crystallization backscattering or reflection from growing crystals first occurs when the crystal size is many times the wavelength of the incident light or when there is multiple scattering or reflection from closely packed microcrystals. Typical microcrystal size of polymers grown under conditions of large supercooling is only 20 to 1000 nm [See Peterlin, *Encyclopedia of Polymer Science and Engineering*, Vol. 10, page 26, H. F. Mark et al. eds., John Wiley, New York (1986)]. This size is too small to backscatter light except when the microcrystals are closely packed. Thus, in polymer crystallization the method of this patent would not detect initial nucleation and crystal growth, and it could only be used to monitor resins of high crystallinity with closely packed microcrystals, a situation which occurs near the completion of crystallization.

Despite the efforts of the prior art, there has remained a need for a method and apparatus for monitoring crystallization and shrinkage of polymeric material during molding.

SUMMARY OF THE INVENTION

It is the object of the present invention to provide a process and apparatus for detecting polymer crystallization during molding.

Another object of the invention is to provide a method and apparatus for detecting polymer shrinkage during molding.

A further object of the invention is to provide a method and apparatus for measuring the rate of polymer shrinkage during molding.

Yet another object of the invention is to provide a method and apparatus for detecting the time of mold filling by a resin introduced therein;

Another object of the invention is to provide a method and apparatus which can detect the time when polymer material in the mold separates from the mold wall because of shrinkage.

An additional object of the invention is to provide a method and apparatus for monitoring polymer molding which can provide in situ measurements in real time.

It is also an object of the invention to provide a method and apparatus for monitoring polymer molding which can measure multiple parameters with a single sensor, particularly an optical sensor.

Yet another object of the invention is to provide a method and apparatus for monitoring polymer molding which utilize a sensor integrated in the mold.

A still further object of the invention is to provide a method and apparatus which can be used to control polymer molding, particularly by feedback control of operating parameters.

Additionally, it is an object of the invention to provide a method and apparatus for monitoring polymer molding which make use of an in situ interferometer produced by shrinkage of the molded polymer material.

The method and apparatus of the invention address the objects by providing a new in situ technique based on optical methods to measure materials properties in real-time.

The objects of the invention are achieved in accordance with one aspect of the invention by a method for monitoring a polymer material during molding thereof, comprising the steps of directing a beam of light through a window in a wall of a mold filled with molten polymer material toward a reflective surface on an opposite mold wall; collecting light reflected from the reflective surface and transmitting the collected light to a detector; and monitoring the intensity of light detected by the detector to detect the onset of crystallization of the polymer material. In accordance with one preferred embodiment, the invention further comprises monitoring the detected light to detect mold filling and/or resin/mold separation. In accordance with another preferred embodiment, the invention further comprises monitoring the detected light to detect interference fringes generated between light reflected from the window and light reflected from the polymer material to detect interference indicative of polymer shrinkage.

In accordance with a further aspect of the invention, the objects are also achieved by providing an apparatus for monitoring a polymer material during molding thereof, which comprises a mold with a cavity comprising a reflective mold surface; a light permeable window in the mold opposite the reflective mold surface; an optical fiber arranged to introduce light through the window into the mold and to collect reflected light from the mold through the window; a light source coupled to the optical fiber to introduce light into the fiber; and a detector for measuring the amplitude of light collected by the fiber.

The method and apparatus of the invention can be used to monitor mold filling, resin crystallization, resin and mold separation, and/or shrinkage of the polymer material.

The invention thus relates to detection of the onset and growth of crystallization and to measurement of polymer product shrinkage during polymer injection molding. The method uses an optical fiber sensor which is inserted through the wall of the mold for the purpose of transmitting incident light and collecting reflected light from the mold and polymer surfaces. Light from a light source such as a laser or an arc lamp is transmitted to the polymer resin through a sapphire optical window which is mounted flush with the mold cavity surface. The incident light follows two principal optical paths.

On the first path, mold filling is detected by an abrupt decrease in light reflected from the sapphire window at its interface with the resin. Also, on the first path, light exits from the window, traverses the polymer resin, reflects from the opposite wall of the mold, retraces its path through the resin, and is collected by the optical fiber. In the case of this first optical path, the detected light intensity is diminished as the optical density of the resin increases upon nucleation and growth of crystallites. The amorphous crystal morphology causes light scattering to the side and forward directions, attenuating the transmitted beam intensity as the crystallites grow in size and number.

On the second path, the resin contracts and separates from the sapphire window as it cools in the mold, thereby creating a gap between resin and window which establishes the geometry of a Fabry-Perot interferometer. Separation of the mold and polymer surface is detected by an abrupt increase in reflected light along this second optical path, followed by interferometer fringes which develop via interfering reflections from the sapphire window and from the receding polymer resin surface. By counting fringes as a function of time, shrinkage and rate of shrinkage of the resin product can be measured in-situ.

The present invention operates on an entirely different principle from fluorescence spectroscopy and does not require the addition of indicating fluorescent dyes. Instead, the method of the present invention functions by monitoring reflected light from the resin surface and the surface of the mold cavity. During the injection molding cycle, this invention performs four functions: it detects mold filling; it monitors crystallization of crystallizable resins; it detects the separation of resin from the mold wall upon shrinkage; and, it monitors resin shrinkage and rate of shrinkage. Advantageous features of the method and apparatus of the invention thus include:

(1) the four-fold functionality of the optical fiber sensor, which is a consequence of the optical fiber and sapphire window arrangement at the mold cavity surface which permits several reflections to be measured, i.e. from the far surface of the mold, from the receding near surface of the resin, and from the sapphire window surface;

(2) the sensitivity to filling of the mold by the resin;

(3) the in-situ, real-time measurement of resin crystallization and rate of crystallization during injection molding;

(4) the sensitivity to resin and mold surface separation;

(5) the self-generating Fabry-Perot interferometer geometry which is created when separation from the mold surface occurs, and which incorporates the surface of the resin as one of its elements;

(6) the in-situ. real-time measurement of resin shrinkage and rate of shrinkage during injection molding; and (7) the measurement system integrated with the injection molding machine consisting of optical excitation and detection equipment, optical fiber sensor, and a computer for acquisition and analysis of the detected light intensity.

BRIEF DESCRIPTION OF THE DRAWINGS

The invention will be described in further detail hereinafter with reference to the accompanying drawings in which.

DETAILED DESCRIPTION OF PREFERRED EMBODIMENTS

Figure 1:
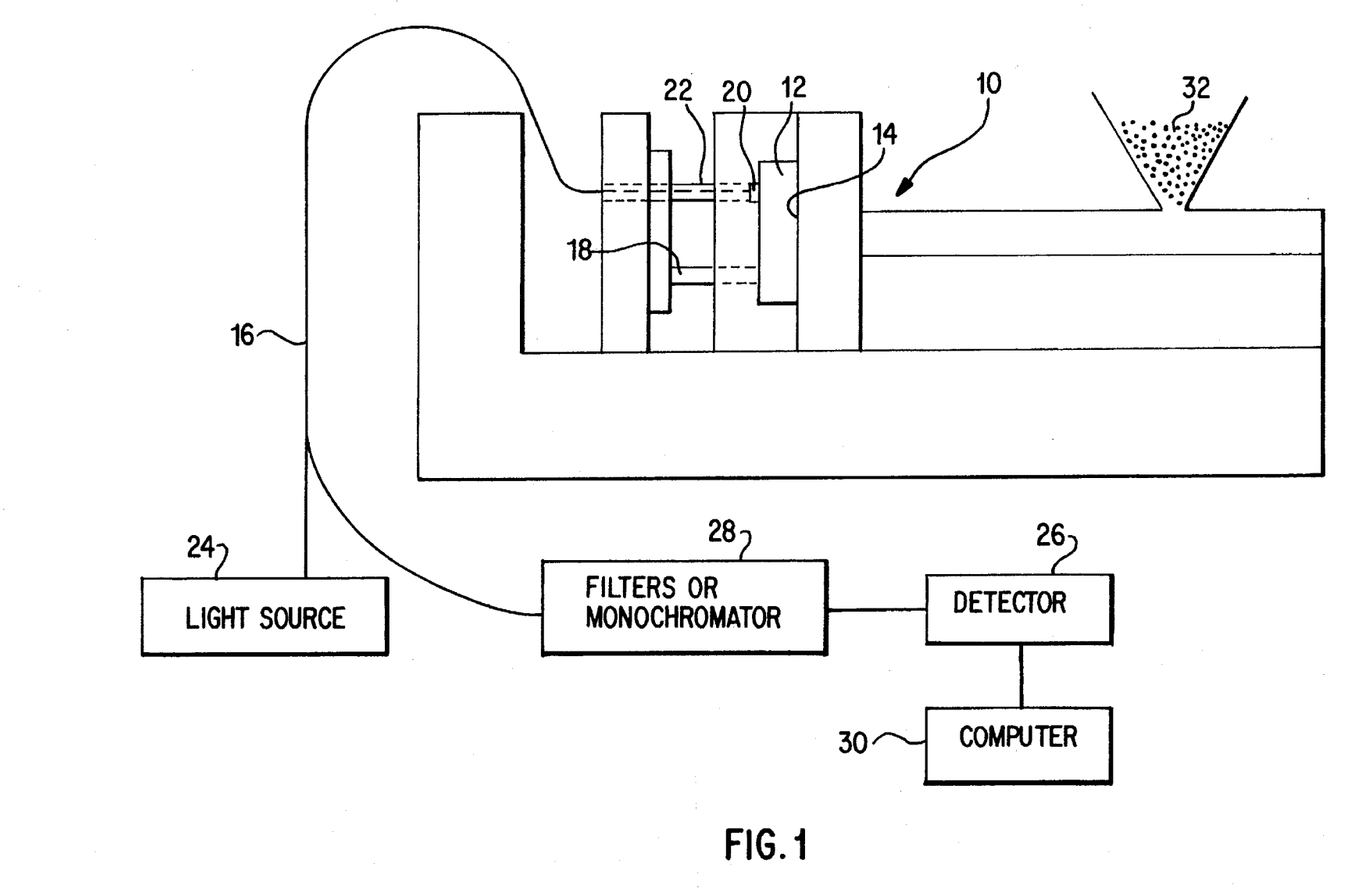
FIG. 1 is a schematic illustration of an apparatus for carrying out the method of the present invention including an injection molding machine, an optical fiber sensor and associated instrumentation.

FIG. 1 is a schematic representation of an example apparatus equipped with optical instrumentation for carrying out the method of the invention. The apparatus comprises an injection molding machine 10 with a mold cavity 12 having a reflective surface 14. Optical sensing occurs at one end, hereinafter referred to as the sensing end, of a bifurcated optical fiber cable 16. Access to the mold cavity 12 is obtained by replacing one of the ejector pins 18 in one of the ejector pin channels with a sleeve 22 of the same diameter into which the sensing end the fiber cable 16 is inserted. A light permeable window 20 is cemented into place at the end of the sleeve in the ejector pin channel, so that the face of the window 20 is positioned flush with the inside surface of mold cavity 12. Window 20, which preferably may be a sapphire window, serves as the interface between mold cavity 12 and the optical fiber cable 16. Each branch of bifurcated cable 16 contains a bundle of fused silica fibers. One branch of the bifurcation is coupled to a light source, while the other branch of the optical fiber cable is connected to a light detector 26. Preferably, the individual optical fibers are protected in an industrial grade cable of stainless steel flexible sheathing.

Any suitable light source which produces light which can be transmitted through optical fibers and through the polymer material being molded can be used in the invention. For example, good results have been obtained with laser light from a helium-neon laser and with light from a xenon arc lamp. Light from the xenon arc lamp was filtered to yield nearly monochromatic light by using a bandpass filter or a monochromator 28.

For the detector 26, a silicon photodiode is suitable for most situations. Alternatively, an increase in sensitivity can be obtained by using a photomultiplier tube detector. The analog signal from the photodetector is transmitted to and stored in a data analyzer or evaluator, such as a conventional digital computer 30, via an analog to digital card.

In operation, resin 32 is injected into mold cavity 12. Light exiting the sensing end of optical fiber 16 traverses a path across the thickness of the resin in the mold cavity, reflects off the far surface 14 of the mold and retraces its path through the resin before being collected by the optical sensor. Thus, the measured light intensity is from a beam which has been transmitted through the resin twice. Small scattering centers along this path, created by microcrystallites and amorphous domains in a semi-crystalline polymer, will scatter light forward and to the side. Light scattered to the side will diminish the intensity of the transmitted beam and will not enter the collection fibers thereby causing a decrease in the detected light intensity. This loss of light intensity due to scattering is viewed as an attenuation of the light. Backscattering or reflection of light from crystallites occurs if the crystallites become much larger than the wavelength of light or there is multiple scattering of light from densely packed smaller crystallites. For low to medium levels of polymer crystallinity only forward and side scattering occur.

Onset of Crystallization

Figure 2:
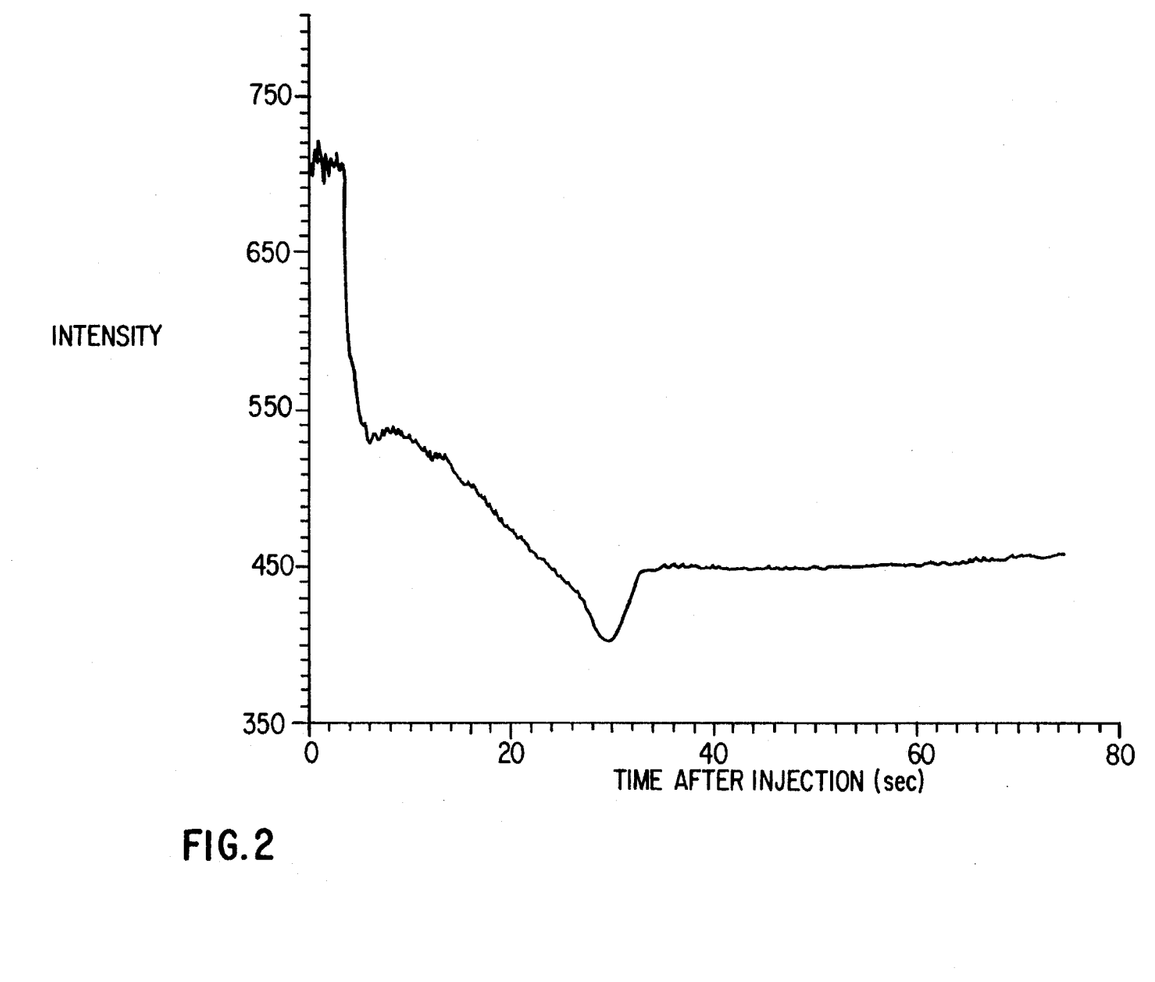
FIG. 2 is a graph of transmitted light intensity versus time for injection molding of polypropylene at an initial mold temperature of 38° C.

The effectiveness of the measurement technique of the present invention is demonstrated by experiments using polypropylene, a crystallizable polymer. The mold and optical fiber were configured as shown in FIG. 1. The thickness of the polypropylene in the mold at the optical sensor was 0.317 cm (⅛ inch). Polypropylene resin at 200° C. (above the crystallization temperature) was injected into the mold whose temperature was held at 38° C. by circulating fluid. FIG. 2 shows the observed light intensity as a function of time. At time zero (t=0), the observed intensity is attributed to light which was reflected from the back wall of the empty mold and from the sapphire window. Mold filling occurred rapidly, in approximately 0.5 seconds. At t=3.5 seconds, the sector of the mold at the optical sensor became filled with resin. The initial abrupt decrease in intensity was due to the change in the reflected light at the sapphire window where the interface changed from sapphire/air to sapphire/resin. The change in slope of the curve at t=4 seconds is attributable to the onset of crystallization. Attenuation of light due to scattering from the two phase amorphous and crystalline material containing growing microcrystallites began at this time. The approximately linear decrease in light intensity between 7 and 27 seconds reflects the growth of crystallites in size and number as the resin cooled below its crystallization temperature. Finally, at t=30 seconds a distinct and characteristic minimum in light intensity was observed. This minimum is attributed to a maximum in the light scattered from a two phase material which contains not only amorphous and crystalline scattering centers but also an amorphous/crystalline interface.

Figure 3:
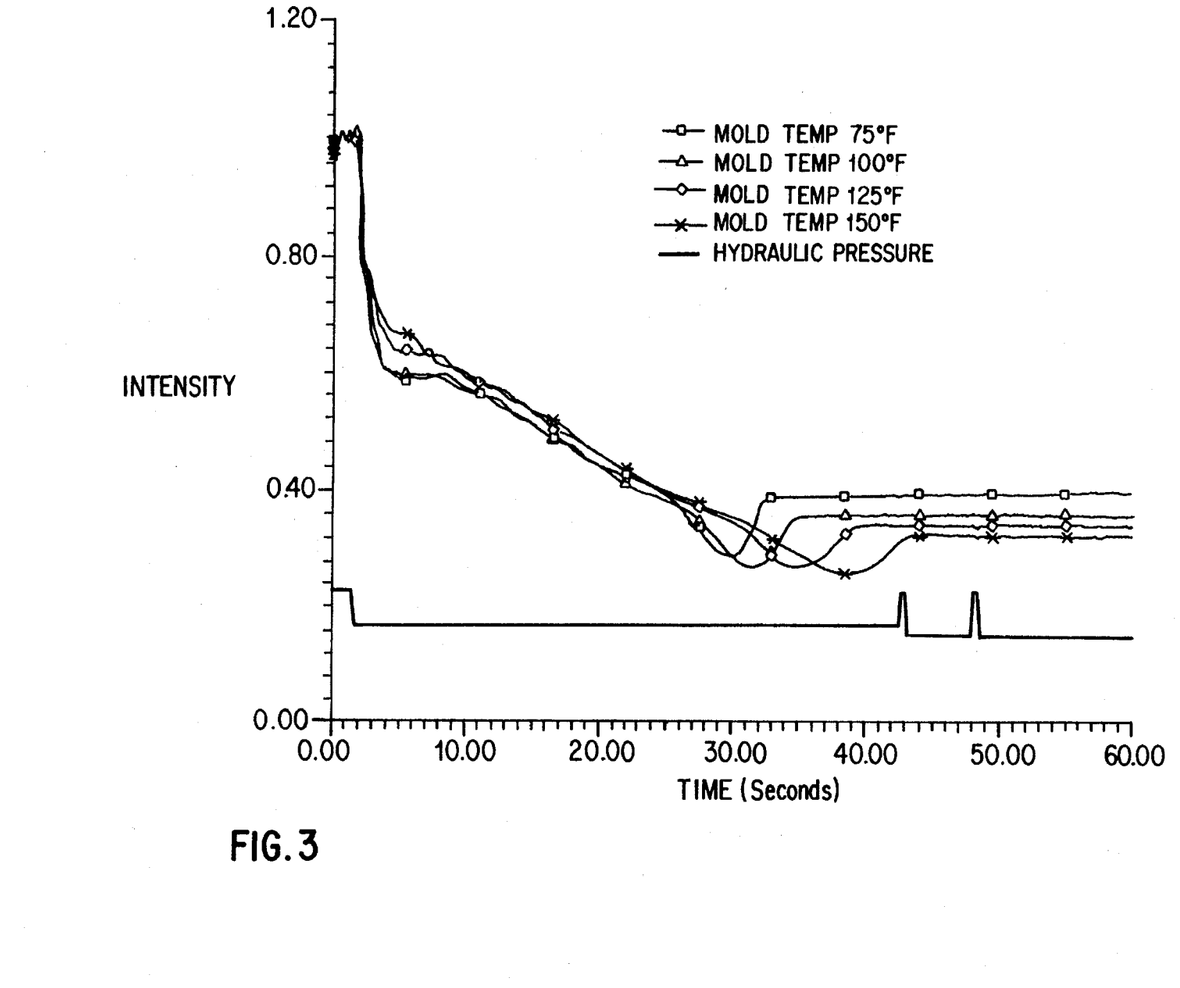
FIG. 3 is a graph of transmitted light intensity versus time for injection molding of polypropylene at initial mold temperatures of 24° C., 38° C., 52° C. and 65° C.

Additional data obtained for mold temperatures held at 65°, 52°, 38° and 24° C. are shown in FIG. 3. While the overall features of these curves are alike, there are distinguishing characteristics:

- At short times, between 2 and 8 seconds, an initial plateau became more pronounced as the mold temperature decreased;
- After the initial plateau, t>8 seconds, all intensities returned to approximately the same value regardless of the mold temperature;
- A minimum in the curves occurred at successively shorter times as the temperature of the mold decreased. The width of this minimum was larger for the warmer molds;
- Each light intensity reached a plateau at long times which shifted to higher levels as the mold temperature decreased.

These features of the four curves are interpreted in terms of morphology, the crystallization growth rate and the magnitude of the final crystallinity. The nucleation and growth of the microcrystals begin at the mold wall. The colder the wall, the larger will be the undercooling and nucleation rate. With time, crystallization advances into the center of the melt resin where cooling progresses at a slower rate. The final plateau, which occurs immediately after the characteristic dip or minimum, is associated with the end of crystallization. The minimum in the curve is believed associated with crystallization of the central core.

Figure 4:
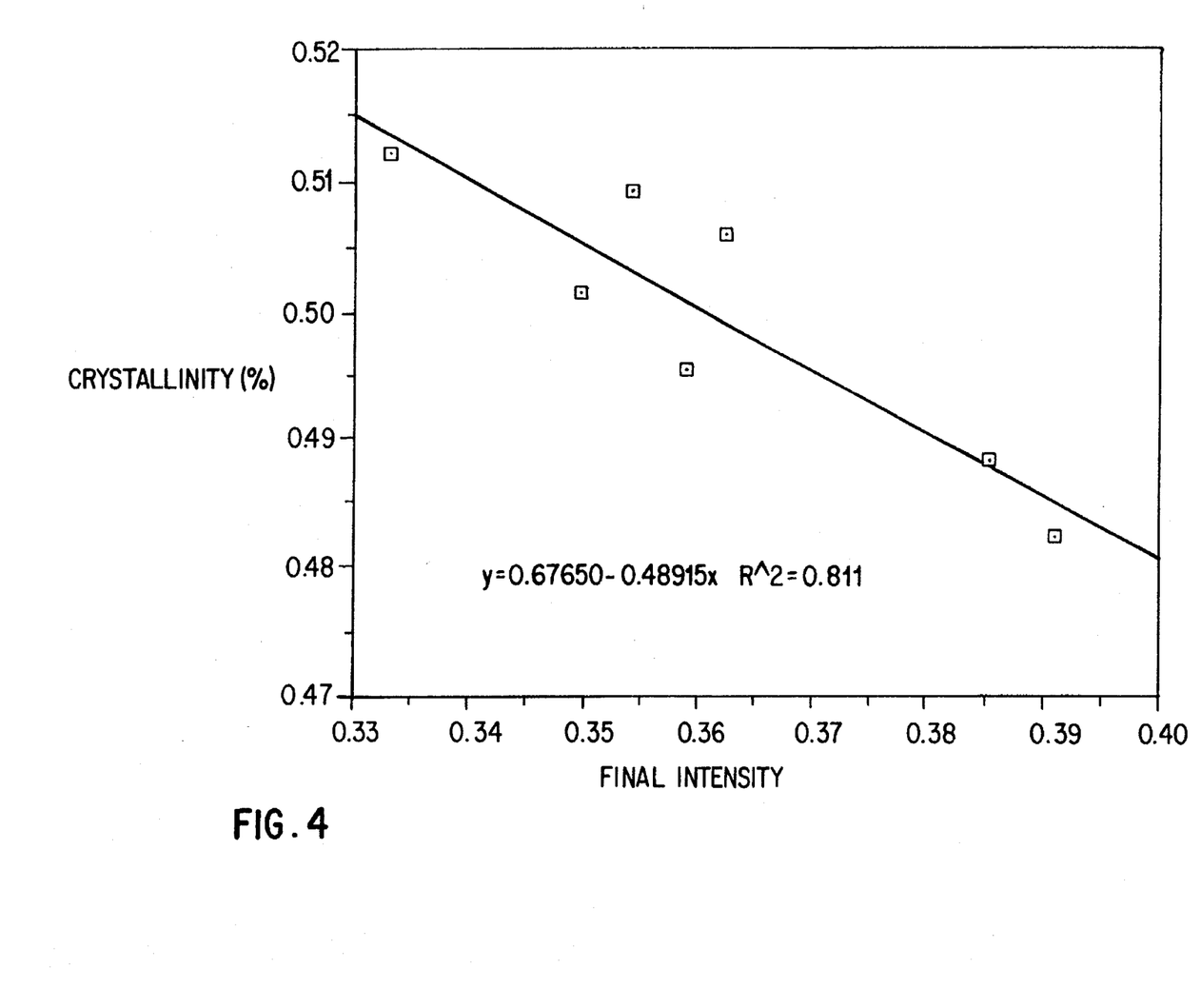
FIG. 4 is a plot of polypropylene crystallinity versus final transmitted light intensity.

The crystallinity X of the molded specimen was obtained from density measurements using $$X = \frac{P_s - P_a}{P_c - P_a}$$

where $P_s$, $P_c$ and $P_a$ are the density of the specimen, the density of the crystalline phase, and the density of the amorphous phase of polypropylene, respectively. Density $P_s$ was obtained from buoyancy measurements in water. The values of $P_c$ and $P_a$ were obtained from J. P. Runt, *Encyclopedia of Polymer Science and Engineering*, Vol. 4, page 487, H. F. Mark et al. eds., John Wiley, New York (1986). In FIG. 4, crystallinity is plotted versus mold temperature and versus the plateau value of the light intensity at long times. It can be seen that crystallinity is a function of the mold temperature, and that the long time light intensity also correlates with crystallinity.

Figure 5:
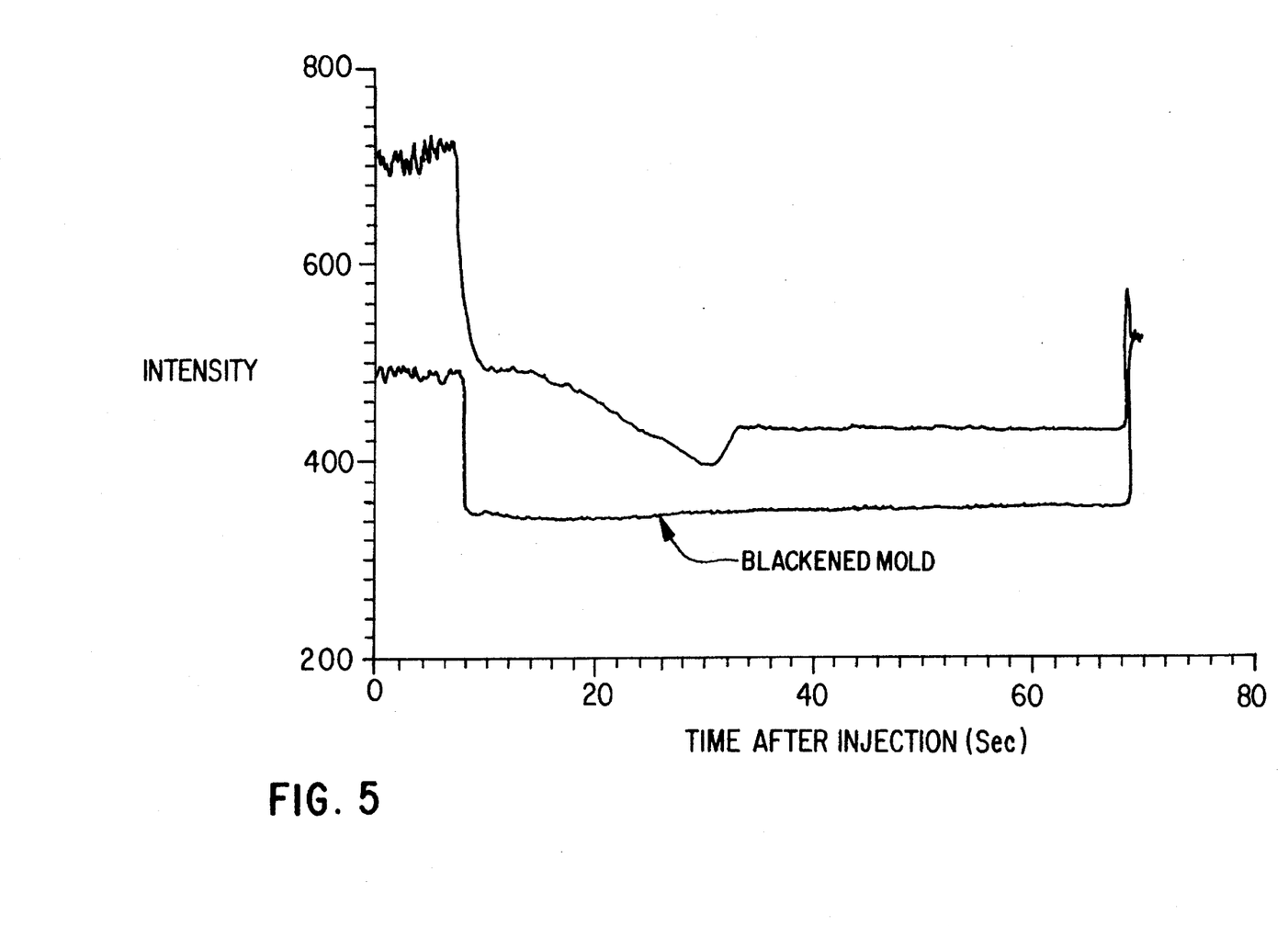
FIG. 5 is a comparative plot of transmitted light intensity versus time for injection molding of polypropylene in molds with and without a blackened mold surface.

A control experiment was carried out in order to demonstrate that the light intensity observations of FIGS. 2 and 3 were due to light reflecting off the opposite wall and retracing its path through the resin to the optical fiber sensor. The experiment consisted of blackening the reflecting wall so that light was absorbed and no reflection occurred. This experiment tested the hypothesis that light is scattered forward and to the side of the beam and that no backscattering (reflection) occurred from the microcrystals and amorphous domains in the resin. The result is shown in FIG. 5 where light intensity is plotted versus time for polypropylene in a mold which was held at 24° C. The light intensity observed between 0 and 10 seconds was the reflection from the sapphire/air interface of an empty mold. The mold is filled at 10 seconds, and the intensity immediately dropped by a factor of 5 and remained at that level. There was no sensitivity to crystallization. This shows that the observations of FIGS. 2 and 3 were of transmitted light which, having reflected off the opposite wall, retraced its path to the optical sensor. Reflection from the resin itself did not occur.

This experiment, which was carried out in order to test for the existence of reflected or backscattered light in a crystallizable polymer, confirms that in polymer crystallization backscattering or reflection from growing crystals first occurs when the crystal size is many times the wavelength of the incident light or when there is multiple scattering from closely packed microcrystals. When the mold surface was blackened in order to eliminate reflection of the illuminating beam from the opposite wall of the mold, no reflected or backscattered light from the growing crystals was detected even though the sensitivity of the detector was equivalent to that used in Chrisman et al., U.S. Pat. No. 4,672,218. Instead, it has been found that the polypropylene crystals scatter light to the side and forward directions and attenuate the transmitted light intensity but do not contribute to reflected light. Neither the dimensions of the spherulite/amorphous structure nor the microcrystals within the spherulite are large enough to cause backscattering or reflection, nor is the density of microcrystals large enough to cause backscattering.

The shape of the light attenuation curve shows the temperature effects of the heat of crystallization. Initially the central core temperature drops as thermal energy diffuses to the mold, but this diffusion process is temporarily halted because of the release of heat due to the heat of crystallization which takes place near the skin and advances inward with time. Calculations performed with mathematical models indicate that the heat of crystallization near the skin momentarily blocks the diffusion of heat from the central core for times between 5 and 25 seconds, so that the crystallization of the core is delayed for a period of approximately 25 seconds. This theoretically calculated time delay correlates well with the time scale of the actual experimental data shown in FIGS. 2 and 3 and to the time of the minimum light intensity near the end of crystallization.

Initially, when the polymer is amorphous, there is no scattering, but as the spherulites grow in the amorphous medium the scattering increases; finally, at end of crystal growth, spherulites fill the total volume of the material and the amorphous/spherulite interface disappears along with the associated scattered light.

An initial value of the ratio of transmitted light to the incident light ($I_t/I_o$=1.00) was observed for the empty mold and corresponded to light which reflected from the sapphire/air interface and from the opposite face of the mold cavity and returned to the optical sensor. The decrease of $I_t/I_o$ from 1.00 to 0.78 occurred upon filling the empty mold with the amorphous polypropylene melt and was due to the change in index of refraction at the sapphire/air(resin) interface. At this initial time, the volume fraction of crystal spherulites is considered zero because no significant crystallization has occurred yet.

The experimental curves show the following features: a period of approximately linear slope, a characteristic minimum, and a final plateau value at long times which increases with decreasing crystallinity. These experimental data correlate well with expected results based on calculations performed with theoretical models and indicate that the optical sensor monitors the growth of crystallinity, that the minimum is caused by spherulite growth and that the light intensity at long times is proportional to final crystallinity.

Although the data shown in FIG. 5 evidences no backscattering of light from the polypropylene microcrystals, thereby confirming that resins of moderate crystallinity (such as polypropylene resin) do not produce backscattering, in highly crystalline resins backscattering from closely packed microcrystals may become significant and should be taken into account in interpreting the light attenuation data.

Shrinkage and Resin/Mold Separation

Figure 6A:
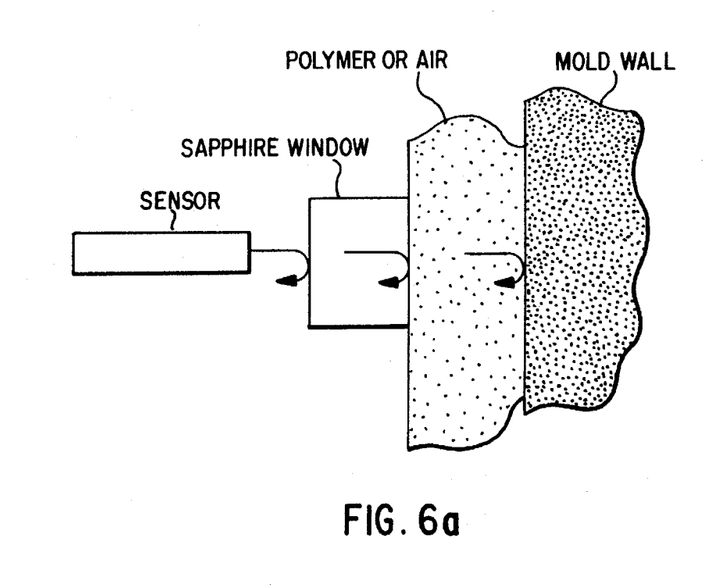
FIGS. 6(a) and 6(b) are diagrams representing light reflection before and after resin separation from the mold surface due to resin shrinkage.

The data presented in FIGS. 2 and 3, are from the time period of the mold cycle before the polymer shrinkage in the mold becomes large enough to cause separation between the solidified resin and the mold wall. As long as the resin remains in contact with the wall, it can be assumed that no significant shrinkage has occurred. Under these circumstances, light reflections occur as shown in FIG. 6(a) at the interfaces between the optical fiber and the window, the window and the polymer material, and the polymer material and the mold wall at the far side of the mold.

Figure 6B:
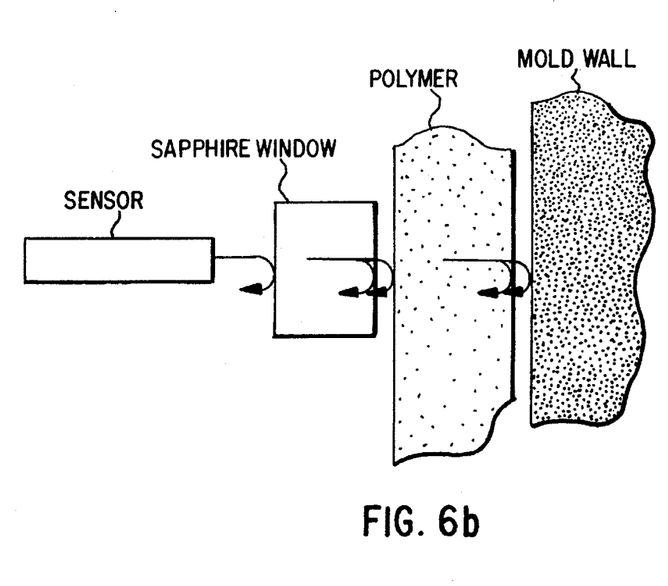
Figure 7:
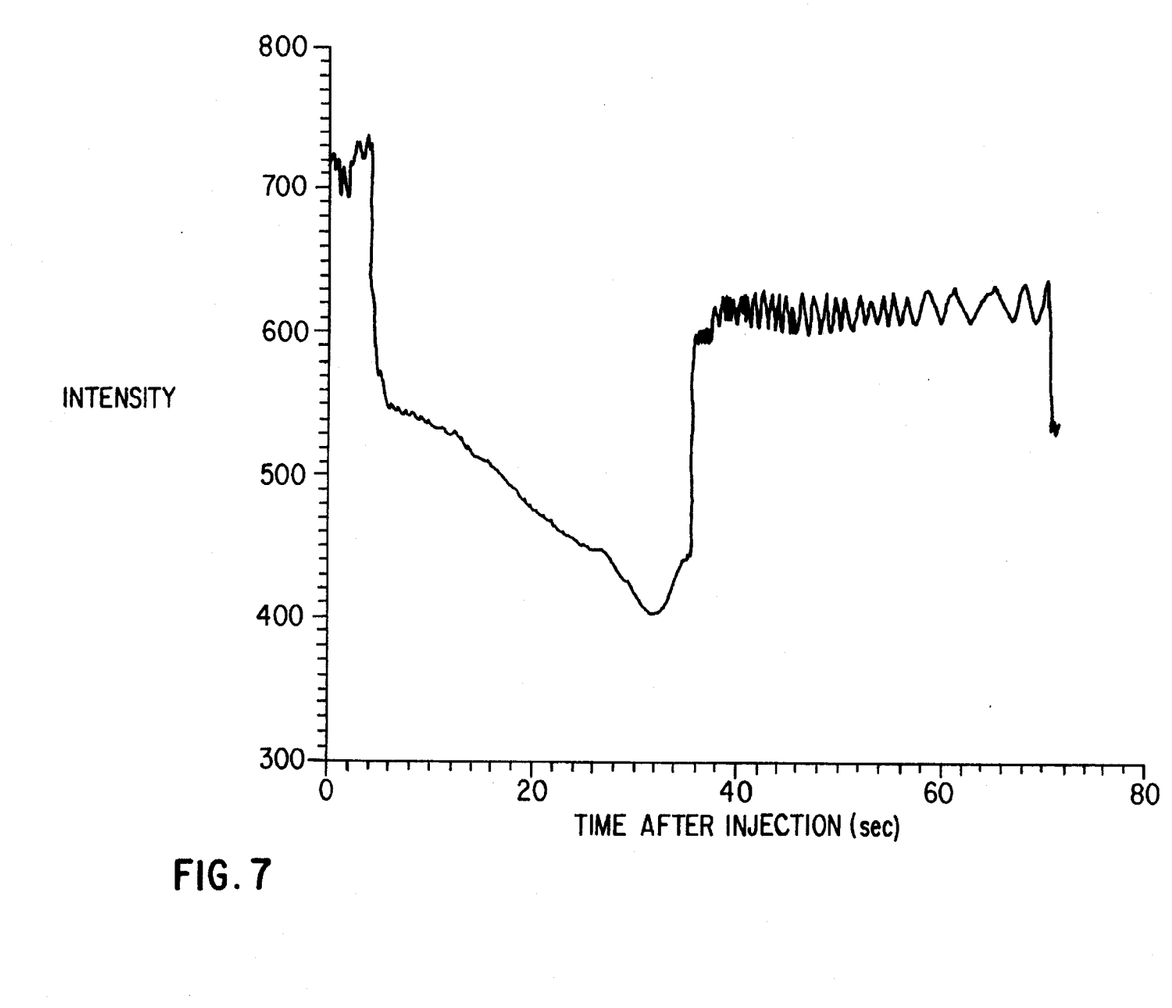
FIG. 7 is a graph of transmitted light intensity versus time for injection molding of polypropylene showing the stepwise decrease in detected light intensity which occurred as the resin filled the mold, the stepwise jump in detected light intensity which occurred upon separation of the polymer material from the mold surface, and the subsequent light oscillations due to resin shrinkage after separation.

The optical consequences of separation between mold surface and the resin are reflections from air/sapphire and air/polymer interfaces in place of the sapphire/polymer interface. Such multiple reflections are diagrammed in FIG. 6(b). Because the index of refraction differences are greater for the separated interfaces than for sapphire/polymer, the reflected intensity is greater. The effect of separation is seen in FIG. 7. At t=36 seconds the large jump in $I_r/I_o$ is attributed to polymer separation from the mold surface.

Another distinctive feature of the data of FIG. 7 is the inception of an oscillatory optical signal immediately after separation. The separating polymer material and sapphire window form parallel surfaces and create the geometry of a Fabry-Perot interferometer. Interferometers are well known instruments incorporated into many types of systems, but prior to the present invention no attempt has ever been made to use an in-situ interferometer to measure polymer resin shrinkage during molding. In accordance with the present invention, light is reflected from both the window surface and the separated polymer surface, and the two reflected beams interfere with each other. As shown in FIG. 6(b) there are more than just these two reflections. However, if all reflections except the reflection from the separated polymer surface are assumed constant with respect to each other, the reflections from these surfaces will interfere with each other in a constant manner. Since reflectance from the sapphire window and from the separated polymer surface is low, multiple reflections can be ignored.

Figure 8A:
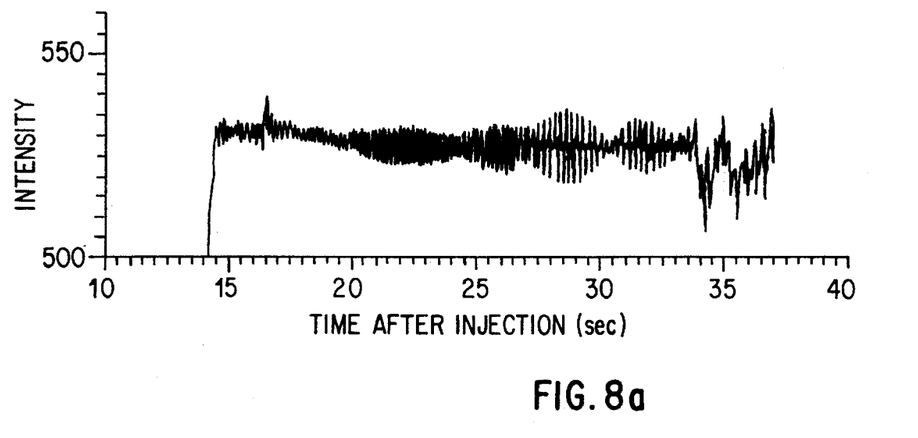
FIGS. 8(a) and 8(b) are graphs of light oscillations generated by resin shrinkage of polystyrene and polyethylene.
Figure 8B:
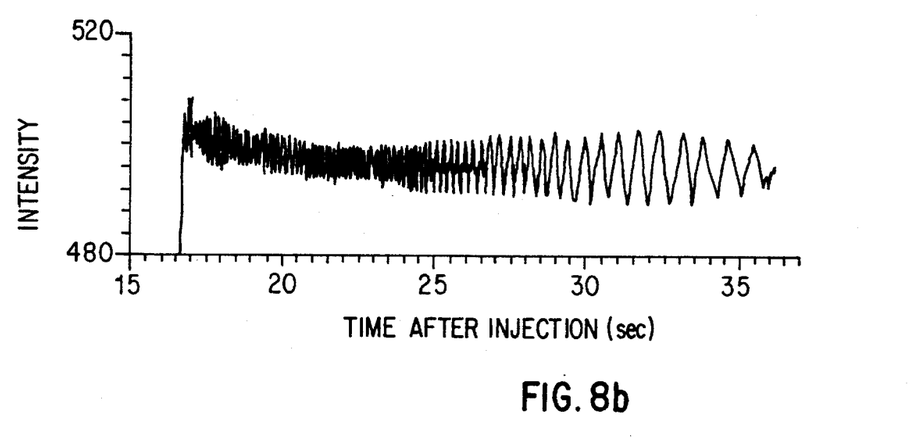

Measurements of shrinkage by counting interference minima were carried out for polyethylene, polystyrene, and polypropylene. The experimental set up corresponded to the arrangement shown in FIG. 1 with an optical sensor in the mold cavity and using a monochromatic light source. FIG. 7 shows interference oscillations for polypropylene during shrinkage. FIGS. 8(a) and 8(b) show similar oscillations during shrinkage for polystyrene and polyethylene, respectively. A very distinct difference between the data of FIG. 3 and that of FIGS. 7 and 8(a) and (b) is the jump in intensity which occurred upon separation of the resin from the sapphire window. The curve shown in FIG. 3 suggests that, for those processing conditions, shrinkage of polypropylene was not large enough to cause the resin to separate from the sapphire window.

Figure 9A:
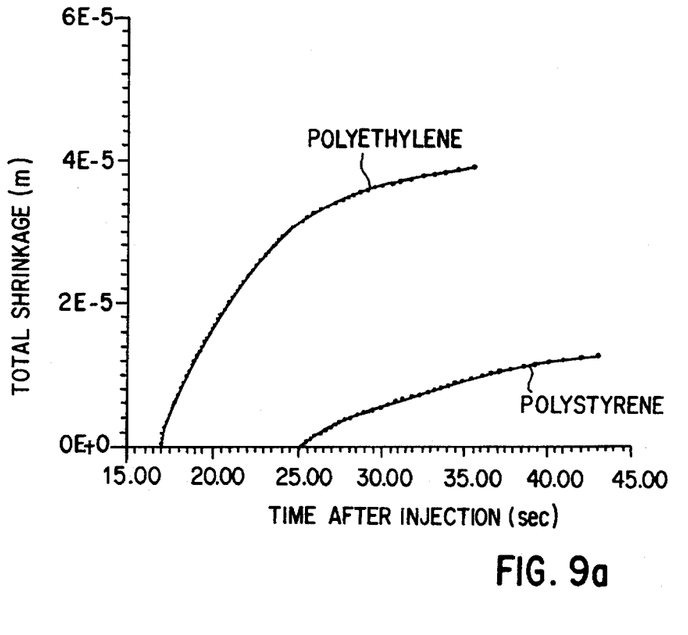
FIGS. 9(a) and 9(b) are graphs of resin shrinkage versus time for polyethylene and polystyrene and for polypropylene.
Figure 9B:
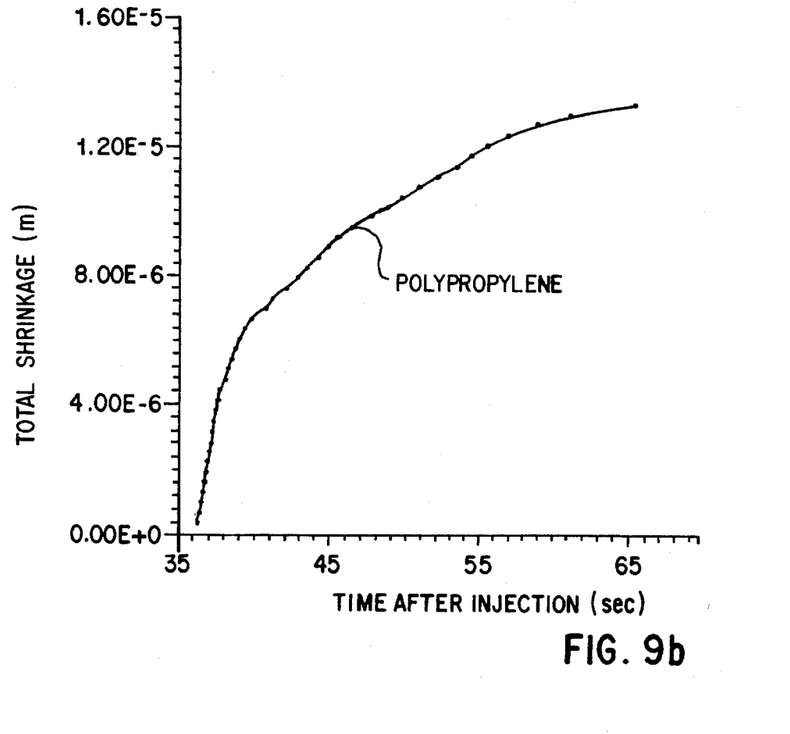

FIGS. 9(a) and 9(b) show shrinkage curves for molded polyethylene and polystyrene and for molded polypropylene, respectively. The shrinkage curves were generated by continuously monitoring the collected light intensities of the interfering reflected light from the window surface and the separated polymer surface as illustrated in FIGS. 7 and 8(a) and (b) and counting the minima of the observed intensities using a programmed digital computer. Preparation of a suitable computer program to count the minima is within the skill of an ordinarily skilled person in the programming art. The spacing between the window surface and the separated polymer material surface can be determined from the minima and the wavelength of the light according to the formula:

$$d = \frac{(m-1)\lambda}{2}$$

where d is the spacing between the window surface and the polymer surface and lambda is the wavelength of the light.

The data show that the shrink rate of the amorphous polymer, polystyrene, is much smaller than that of the semi-crystalline polymers, polyethylene and polypropylene. This follows the same trend as reported values of final shrinkage of these polymeric materials [See Carley, *Modern Plastics Encyclopedia* '89, p. 4, Juran ed., McGraw Hill, New York (1989)].

In some cases it may not be possible to measure the order number m of a minimum because the oscillations occur too rapidly at the onset of the separation to be resolved by the data acquisition equipment. In this case, the rate of shrinkage at later times can be used as the process parameter of interest.

Another approach for measuring the separation distance with this set up is to use achromatic or white light. The advantage here is that the separation distance can be obtained without counting the number of minima. This is accomplished by observing intensity as a function of wavelength. At any separation distance, only a few specific wavelengths will satisfy the condition for destructive interference. Two consecutive minima at wavelengths $\lambda_1$ and $\lambda_2$ are related to the separation distance by $$d = \frac{\lambda_1 \lambda_2}{2(\lambda_1 - \lambda_2)}$$

In practice the white light measurement requires the simultaneous acquisition of intensity at all wavelengths. This can be done using a grating monochromator and charge coupled devices (CCD) in an array format.

This invention is distinguished from other optical fiber sensors by several unique features:

(a) the device has a four-fold functionality; first, it is a detector of mold filling; second, it is a detector of transmitted light intensity associated with polymer crystallization; third, it detects the onset of resin/wall separation by a large jump in intensity; and fourth, it is an interferometer for measuring resin shrinkage and rate of shrinkage;

(b) the interferometer geometry generates itself by the onset of the very effect which it detects, and (c) the interferometer uses the surface of the resin as one of its working elements.

The invention thus comprises a single device which functions as four sensors. Its four-fold functionality is an inherent characteristic, a consequence of its design. The device detects light intensity at any time during resin processing and, as demonstrated by the data of FIG. 7, will perform as a mold fill monitor, a crystallization monitor, a resin/wall separation detector, and/or an interferometer for measuring resin shrinkage.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring crystallization and shrinkage of a polymer material during molding thereof, said method comprising the steps of:

directing a beam of light through a window in a wall of a mold filled with molten polymer material toward a reflective surface on an opposite mold wall;

collecting light reflected from said reflective surface and transmitting the collected light to a detector; and monitoring the intensity of light detected by said detector to detect the onset of crystallization of the polymer material.

2. A method according to claim 1, further comprising monitoring the detected light to detect interference fringes generated between light reflected from said window and light reflected from said polymer material to detect interference indicative of polymer shrinkage.

3. A method according to claim 1, further comprising monitoring the detected light to detect separation of the polymer material from the mold.

4. A method according to claim 1, wherein said polymeric material is selected from the group consisting of polyethylene, polypropylene and polystyrene.

5. A method according to claim 1, wherein results of said monitoring are used to control a molding parameter selected from the group consisting of mold temperature, polymer injection temperature, injection pressure, holding pressure in said mold, and mold residence time.

6. A method according to claim 1, wherein said mold is an injection mold, and said window is a sapphire optical window mounted flush with a surface of said mold.

7. A method according to claim 1, wherein said light is introduced through said window from an optical fiber and reflected light is collected by the same optical fiber.

8. A method according to claim 1, further comprising counting detected interference fringes per unit time in order to determine the rate of polymer shrinkage.

9. A method according to claim 1, wherein said light is laser light from a helium-neon laser.

10. A method according to claim 1, wherein said light is light from a xenon arc lamp.

11. A method according to claim 1, wherein said light is filtered to obtain substantially monochromatic light.

12. A method according to claim 1, wherein said detector comprises a photodiode or a photomultiplier tube.

13. A method according to claim 1, wherein said optical fiber has a bifurcated end remote from said mold, wherein one part of said bifurcated end is operatively coupled to a light source to capture light from said light source and introduce said captured light into the mold, and the other part of said bifurcated end is operatively coupled to said detector to deliver collected reflected light to said detector.

14. A method for monitoring crystallization and shrinkage of a polymer material during molding thereof, said method comprising the steps of:

directing a beam of light through a window in a wall of a mold having a reflective surface on an opposite mold wall;

continuously collecting reflected light and transmitting the collected light to a detector;

filling said mold with molten polymer material;

monitoring the intensity of light detected by said detector to detect filling of the mold and the onset of crystallization of the polymer material; and monitoring the detected light to detect interference fringes generated between light reflected from said window and light reflected from said polymer material to detect interference indicative of polymer shrinkage.

15. An apparatus for monitoring crystallization and shrinkage of a polymer material during molding thereof, said apparatus comprising:

a mold with a cavity comprising a reflective mold surface;

a light permeable window in said mold opposite said reflective mold surface;

an optical fiber arranged to introduce light through said window into said mold and to collect reflected light from said mold through said window;

a light source coupled to said optical fiber to introduce light into said fiber; and a detector for measuring the amplitude of light collected by said optical fiber.

16. An apparatus according to claim 15, wherein said window comprises a sapphire window in a wall of said mold opposite said reflective surface.

17. An apparatus according to claim 15, wherein said optical fiber has a bifurcated end remote from said mold, one part of said bifurcated end being operatively coupled to said light source to capture light from said light source and introduce the captured light into the mold, and the other part of said bifurcated end is operatively coupled to said detector to deliver collected reflected light to said detector.

18. An apparatus according to claim 15, wherein said light source further comprises means for converting light from said light source to monochromatic light prior to introduction of the light into the mold.

19. An apparatus according to claim 15, wherein said light source comprises a laser light source.

20. An apparatus according to claim 15, wherein said sensor comprises an in situ interferometer produced by shrinkage of polymer material in said mold for counting interference fringes between light waves reflected from the window and light waves reflected from the polymer material.

* * * * *